Oct. 19, 1926.
J. J. LENTZ
1,603,479
APPARATUS FOR MAKING GLASSWARE
Original Filed July 22, 1925
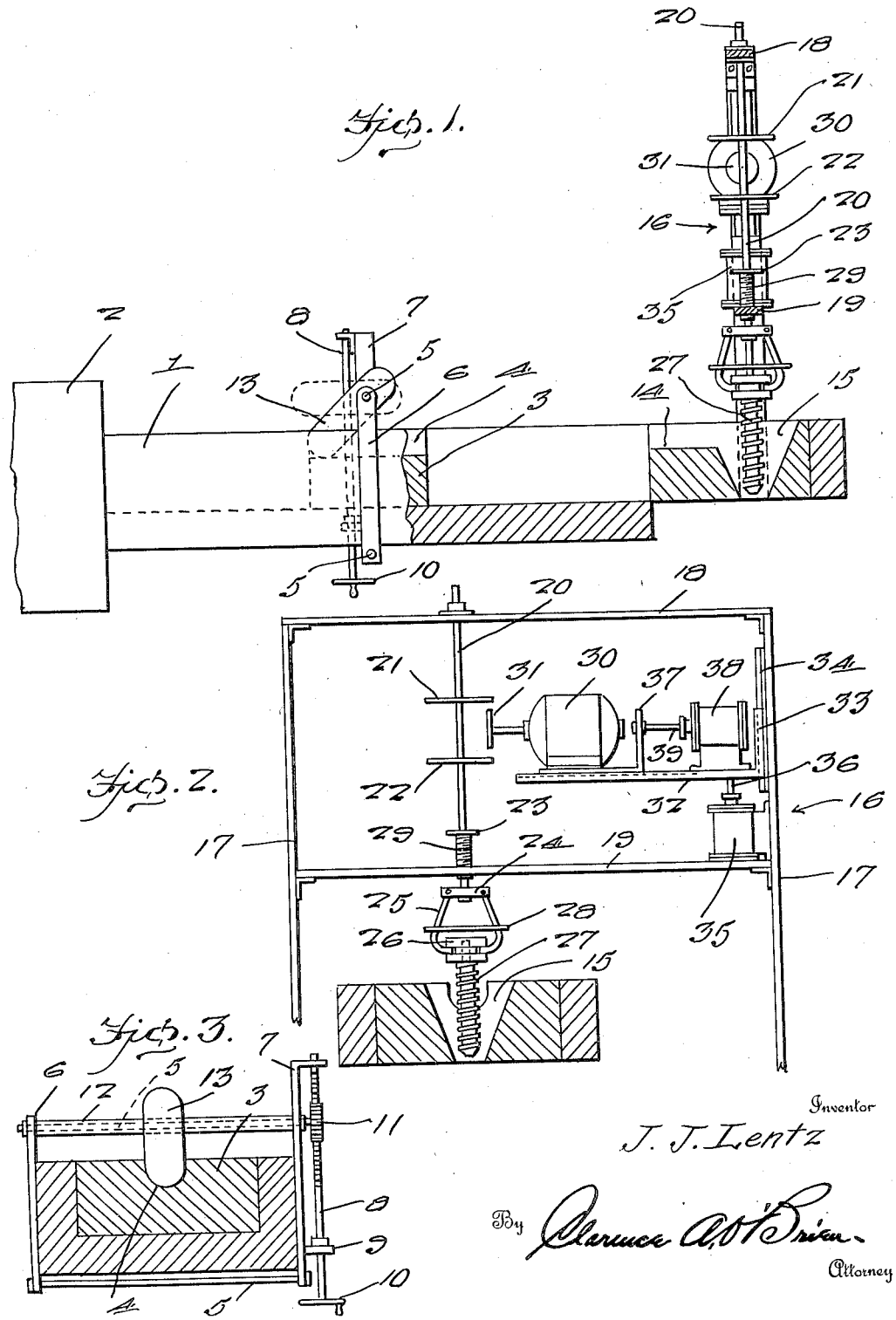
Inventor
J. J. Lentz
By Clarence A. O'Brien
Attorney Patented Oct. 19, 1926.

1,603,479

UNITED STATES PATENT OFFICE.

JOHN J. LENTZ, OF BUTLER, PENNSYLVANIA.

APPARATUS FOR MAKING GLASSWARE.

Application filed July 22, 1925, Serial No. 45,324. Renewed August 19, 1926.

This invention relates to an apparatus to be used in the art of making glassware, and it has more particular reference to a means embodied in such an apparatus for controlling the flow of the molten glass so that it may be regulated according to the consistency, or fluidity, whereby to permit the formation of the wares with greater accuracy and facility.

Broadly, the apparatus comprises a trough at one end of which is the supply tank, and at the opposite end of which is the temperatured discharge through which the gobs of glass escape. Between the ends of the trough is a grooved block for impeding the flow of the glass, and special manually controlled device is associated with this for regulating, or entirely cutting off the flow of the molten glass. Then at the discharge end is an automatically rotated device for controlling the discharge of the gobs according to the consistency and temperature of the glass.

The particular construction of these details together with the accompanying features and advantages will become clear from the following description and drawings.

In the accompanying drawings forming a part of this application, and in which like numerals are employed to designate like parts throughout the same:

Figure 1 is a side view, partly in section, of an apparatus constructed in accordance with the present invention.

Figure 2 is a cross section through the discharge end of the trough showing the automatically operable controlling means associated with the discharge opening.

Figure 3 is a section through the manually manipulated means for controlling the flow of the molten glass through the trough.

Referring to the drawings in detail, the reference character 1 designates the channel shaped trough, and 2 indicates a tank at one end of the trough from which the molten glass flows. Intermediate the edge of the trough is a clay block 3, having a groove 4 through which the molten glass may pass. Connected by bolts 5 to the sides of the trough are uprights 6 and 7. The upright 7 is of a greater height than the upright 6 and is provided at its top with a bracket in which a worm screw 8 is journaled for rotation. A complemental bracket 9 is carried by the lower portion of the upright 7, and there is a hand wheel 10 on the bottom of this screw. Cooperating with the screw is a worm wheel or its equivalent 11, and keyed to one end of a rock shaft 12 of tubular form. Mounted between the ends of this rock shaft is an eccentric 13 serving as a valve to operate in the groove 4. By rotating the hand wheel 10, the screw shaft 8 will be turned to act on the shaft 12 and to swing the valve 13 either to the dotted or full line positions indicated in Figure 1. When in the full line position the valve will cut off the flow of the glass from the left hand side of the trough to the right hand side. When the valve is lifted completely up to the dotted line position, the glass will be permitted to flow freely through the trough.

Assuming now that the valve is open, it will be seen that when the molten mass assumes a predetermined level it will overflow into the clay block 14. This block is provided with a conical discharge opening 15 through which the overflowing mass passes. It is with this conical discharge opening 15 that the novel automatically operable control device is associated. This device is more plainly shown in Figure 2, and by referring to this figure it will be seen that the reference character 16 designates a frame embodying vertical uprights 17 and horizontal cross bars 18 and 19 respectively. Journaled in appropriate bearings in these cross pieces is a vertical rotary shaft 20, provided with vertically spaced friction driving discs 21 and 22. Below the disc 21 is a stop collar 23, and on the lower end of the shaft is a cross head 24 to which clamping finger 25 are pivoted. The inturned lower ends of these fingers are adapted for reception in the groove in a head 26 on the upper end of a worm screw 27. A clamping ring 28 surrounds these fingers and serves to maintain them in operative engagement with the head. It will be noted that the horizontal lower bar 19 is provided with a screw thread hole, and that the sleeve 29 is threaded into this hole. The sleeve is engaged with the under side of the collar 23, and by adjusting the sleeve, the entire shaft 20 with the complemental details including the clamping means and worm screw may be adjusted up or down to regulate the size of the conical discharge opening 15. Obviously, it is desirable to regulate the discharge of the gobs of the molten glass according to the fluidity and temperature of the glass. If the glass flows too freely, it is difficult to blow the same into the desired shape of objects. Likewise, if it flows too slow it is just as difficult to form an object of perfect shape. Accordingly, it is desired to regulate the flow of the fluid according to the consistency, and this consistency is determined by the temperature. Therefore, by having the adjustable worm feed, or screw 27, this regulation can be effectively accomplished. This hand adjustment however is not depended upon to accomplish the complete result sought. It is desired to maintain the shaft in continuous rotation, and in carrying out this I provide an electric motor 30, the shaft of which is provided with a friction drive disc 31 which may be engaged with either one of the discs 21 or 22. In order to bring about the proper engagement of the discs, means is provided for elevating and lowering the motor. The means comprises a horizontal bracket 32, having an upstanding end 33 slidably engaged with a dove-tail bar 34 carried by the right hand upright 17. It should be noted that there is a cylinder 35 mounted on the horizontal cross piece 19, and that there is a piston in this cylinder, the stem 36 of which is connected with the bracket 32 so that by introducing the fluid into the cylinder and operating upon the piston, the bracket may be raised up or lowered to the desired position. Suitable valved means is employed for this purpose, although I have not shown such means. Mounted for horizontal movement on the vertically movable bracket 32 is a right angular bracket 37, to the horizontal arm of which the electric motor 30 is connected. Also mounted on the bracket 32 is a cylinder 38, the piston rod 39 of which is connected to the bracket 37 for adjusting the same. This piston rod is operated in the same manner that the piston rod 36 is operated.

From the foregoing description it will be seen that the bracket 32 may be raised or lowered to bring the disc 31 into effective driving contact with either the disc 21, or the disc 22, as is desired. By bringing it into contact with one disc, the shaft 20 will be rotated in one direction, and vice versa. The rotation of the shaft may be maintained for driving in one direction for a predetermined length of time, and may then be reversed, or the action may be made alternate, as desired. Under both conditions, the motor will be raised, and engaged with the disc 21 for instance to rotate the shaft in one direction for a certain length of time, at which time the motor will be set and held in this position by the cylinder and piston arrangement specified. If it is desired to vary the speed of rotation of the shaft it is obvious that this may be accomplished by adjusting the bracket 37 in or out to bring the disc 31 closer to, or further from the periphery of the disc on the shaft 20 with which it is engaged. Thus, we have a reversible rotary shaft which may be raised and lowered by a hand operated structure. Obviously, the worm 27 will act as a feed screw for facilitating the discharge of the gobs of glass through the tapered discharge opening 15. As stated, however, the discharge action may be regulated as occasion demands.

No doubt, a careful consideration of this description in connection with the drawings, will enable persons skilled in the art in which the invention relates to obtain a clear understanding of the same. Moreover the advantages derived from a structure of this kind will be plain. Therefore, a more lengthy description is thought unnecessary.

While the preferred embodiment of the invention has been shown and described, it is to be understood that minor changes coming within the field of invention claimed may be resorted to if desired.

Having thus described the invention, what I claim as new is:—

1. In an apparatus of the class described, means for regulating the flow of glass comprising a frame, a vertical shaft journaled for rotation in bearings on said frame, upper and lower friction driving discs carried by said shaft, a feed screw connected to the lower end of the shaft, and an adjustably mounted motor disposed in close proximity to said discs, there being a friction driving disc on the shaft of said motor cooperable with either one of the first named discs.

2. In a structure of the class described, a supporting frame, a horizontal vertically adjustable bracket mounted on said frame, a second bracket mounted on said first bracket and adapted for horizontal adjustment, a motor carried by said second named bracket, and means whereby said brackets may be simultaneously or separately adjusted.

3. In a structure of the class described, a supporting frame, a vertically disposed shaft mounted for rotation upon said frame, superposed friction driving discs carried by said shaft, a shoulder on said shaft, a screw threaded sleeve carried by said frame and engageable with said shoulder for raising and lowering said shaft, a clamping device on the lower end of the shaft, a feed screw provided with a grooved head, said clamping device embodying pivotally connected fingers engaged with the groove in said head.

In testimony whereof I affix my signature.

JOHN J. LENTZ.